(12) United States Patent
Towb et al.

(10) Patent No.: US 6,506,434 B1
(45) Date of Patent: Jan. 14, 2003

(54) PROCESS FOR COATING N-[N-(3,3-DIMETHYLBUTYL)-L-α-ASPARTYL]-L-PHENYLALANINE 1-METHYL ESTER ONTO A CARRIER

(75) Inventors: Allan Towb, Buffalo Grove, IL (US); Douglas Nolte, Carpentersville, IL (US)

(73) Assignee: The NutraSweet Company, Chicago, IL (US)

( * ) Notice: Subject to any disclaimer, the term of this patent is extended or adjusted under 35 U.S.C. 154(b) by 0 days.

(21) Appl. No.: 09/633,154

(22) Filed: Aug. 4, 2000

Related U.S. Application Data

(60) Provisional application No. 60/147,390, filed on Aug. 6, 1999.

(51) Int. Cl.[7] ............................................. A23L 1/236
(52) U.S. Cl. ........................... 426/548; 426/89; 426/96; 560/40
(58) Field of Search ............................. 426/548, 89, 96, 426/103; 560/40, 41

(56) References Cited

U.S. PATENT DOCUMENTS

| | | | | |
|---|---|---|---|---|
| 3,928,633 A | * | 12/1975 | Shoat et al. ................. | 426/548 |
| 4,554,167 A | * | 11/1985 | Sorge et al. ................. | 426/548 |
| 4,883,685 A | | 11/1989 | Kondou ....................... | 426/658 |
| 5,480,668 A | * | 1/1996 | Nofre et al. ................. | 426/548 |
| 5,510,508 A | | 4/1996 | Claude et al. ................ | 560/41 |
| 5,728,862 A | | 3/1998 | Prakash ....................... | 560/40 |
| 6,180,157 B1 | * | 1/2001 | Fotos et al. ................. | 426/548 |

FOREIGN PATENT DOCUMENTS

| | | |
|---|---|---|
| EP | 0 303 295 | 2/1989 |
| WO | 98/39979 | * 9/1998 |
| WO | 99/62354 | 12/1999 |
| WO | 00/15050 | 3/2000 |

OTHER PUBLICATIONS

Buvardi, The Merck Index 12th Edition, Merck & Co., p. 758, No. 4467; (1996).
Patent Abstracts of Japan, vol. 8, No. 162 (C–235), Jul. 26, 1984 (corresponds to JP 59–063158).

* cited by examiner

*Primary Examiner*—Leslie Wong
(74) *Attorney, Agent, or Firm*—Fitzpatrick, Cella, Harper & Scinto; Jeffrey M. Hoster

(57) ABSTRACT

The present invention relates to a process for coating N-[N-(3,3-dimethylbutyl)-L-α-aspartyl]-L-phenylalanine 1-methyl ester onto a carrier. The invention also relates to N-[N-(3,3-dimethylbutyl)-L-α-aspartyl]-L-phenylalanine 1-methyl ester coated carrier compositions.

8 Claims, No Drawings

PROCESS FOR COATING N-[N-(3,3-DIMETHYLBUTYL)-L-α-ASPARTYL]-L-PHENYLALANINE 1-METHYL ESTER ONTO A CARRIER

This application claims the benefit of U.S. Provisional Patent Application No. 60/147,390, filed Aug. 6, 1999.

BACKGROUND OF THE INVENTION

1. Field of the Invention

The present invention relates to a process for coating N-[N-(3,3-dimethylbutyl)-L-α-aspartyl]-L-phenylalanine 1-methyl ester (neotame) onto a carrier. The invention also relates to N-[N-(3,3-dimethylbutyl)-L-α-aspartyl]-L-phenylalanine 1-methyl ester coated carrier compositions. This invention further relates to a process of sweetening food products with a N-[N-(3,3-dimethylbutyl)-L-α-aspartyl]-L-phenylalanine 1-methyl ester coated carrier composition of the present invention, as well as to food products sweetened thereby.

2. Related Background Art

It is known that N-[N-(3,3-dimethylbutyl)-L-α-aspartyl]-phenylalanine 1-methyl ester (neotame) is an extremely potent sweetening agent (about 8000×sweeter than sugar) that has the formula

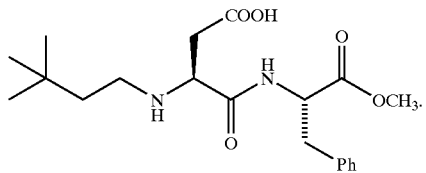

The use of a high potency sweetener such as N-[N-(3,3-dimethylbutyl)-L-α-aspartyl]-L-phenylalanine 1-methyl ester requires consideration of the ability to deliver the sweetener in a given application.

Typically, a dry blend of neotame and a bulking agent is formed in order to deliver a desirable level of sweetness. For example, a typical dry blend of neotame and Unidex (CPC International, Summit/Argo, Ill.; blend of 97% by weight dextrose and 3% by weight maltodextrin) would require blending about 99.875% by weight Unidex with about 0.125% by weight neotame.

The use of small amounts of neotame powder to prepare dry blends with a bulking agent presents several manufacturing difficulties. Not surprisingly, dry blends prepared using a relatively small amount of neotame and a relatively large amount of a bulking agent may exhibit poor content uniformity. Because of the relatively small amount of neotame as compared to bulking agent, these dry blends also may exhibit a high degree of segregation and dusting. Moreover, the content uniformity and segregation problems associated with such dry blends often worsen during shipping and also during periods of storage. Consequently, these dry blends may be somewhat unattractive for manufacturers of consumer products as well as for consumers.

Agglomerates of neotame with a carrier have been formed as described in U.S. patent application Ser. No. 09/252,072, filed Feb. 18, 1999, now U.S. Pat. No. 6,180,157, the entire disclosure of which is incorporated by reference herein. Generally, agglomerates of neotame are formed by providing a premix solution comprising neotame and a binding agent, fluidizing a carrier, and applying the premix solution onto said fluidized carrier. By forming agglomerates of neotame in this way, acceptable levels of sweetness can be efficiently delivered.

U.S. Pat. No. 4,554,167 describes a method for producing a free-flowing agglomerate of aspartame and a food acid such as citric acid. The method includes blending, heating and cooling steps. Importantly, the method specifically excludes the introduction of aqueous agglomeration vehicles and the use of temperatures which are above the melting points of one or more of the ingredients.

U.S. Pat. No. 3,928,633 describes a process for stabilizing aspartame crystals into a particulate form. The particulate form can be mixed with other powdered materials to yield a free-flowing composition. The method includes heating a mixture of a matrix-forming material and aspartame crystals at such a temperature as to melt the material but not the aspartame crystals, thereby encapsulating the aspartame.

Another way to address the difficulties described above with respect to simple dry blends of neotame, and also to provide neotame in a deliverable form while reducing cost and increasing efficiency, is to form neotame coated carrier compositions. In short, the neotame coated carrier compositions of the present invention provide neotame in a deliverable form, which provides an acceptable level of sweetness and exhibits excellent content uniformity and reduced dusting and segregation, as compared to neotame dry blend preparations.

SUMMARY OF THE INVENTION

The present invention is directed to a process for coating N-[N-(3,3-dimethylbutyl)-L-α-aspartyl]-phenylalanine 1-methyl ester onto a carrier. This process comprises the steps of heating the carrier to a temperature above the melting point of N-[N-(3,3-dimethylbutyl)-L-α-aspartyl]-phenylalanine 1-methyl ester; combining N-[N-(3,3-dimethylbutyl)-L-α-aspartyl]-L-phenylalanine 1-methyl ester with the heated carrier; and cooling the mixture to form a N-[N-(3,3-dimethylbutyl)-L-α-aspartyl]-L-phenylalanine 1-methyl ester coated carrier composition.

This invention is also directed to N-[N-(3,3-dimethylbutyl)-L-α-aspartyl]-phenylalanine 1-methyl ester coated carrier compositions comprising a carrier and N-[N-(3,3-dimethylbutyl)-L-α-aspartyl]-L-phenylalanine 1-methyl ester made according to the process described above.

In preferred embodiments of the present invention, the carrier is selected from sucrose, citric acid, maltodextrin, dextrose, lactose, inulin, erythritol, sorbitol, maltitol, lactitol, isomalt, maltose, tagatose, fructose, polyols, polydextrose, cellulose and cellulose derivatives, aspartame, acesulfame salts, sucralose, cyclamate, saccharin, stevioside, alitame, malic acid and mixtures thereof.

In certain embodiments of the present invention, N-[N-(3,3-dimethylbutyl)-L-α-aspartyl]-L-phenylalanine 1-methyl ester is present in an amount of from about 0.01% to about 12%, preferably from about 0.1% to about 5%, and most preferably from about 1% to about 2.5%, by weight of the carrier in the neotame coated carrier compositions of the present invention.

Additional embodiments of the present invention are directed to food products sweetened with neotame coated carrier compositions and to methods of sweetening food products with neotame coated carrier compositions.

DETAILED DESCRIPTION

One embodiment of the present invention is directed to a process for coating N-[N-(3,3-dimethylbutyl)-L-α- aspartyl]-phenylalanine 1-methyl ester (neotame) onto a carrier. In effect, heated carrier is combined with neotame to produce neotame coated carrier compositions. This is possible due to the relatively low melting point of neotame and its physical forms and because of the stability of neotame and its physical forms at the temperatures involved in the instant process, as compared to other high potency sweeteners.

The present process can be accomplished in one reaction vessel and with no additional materials beyond the carrier and neotame itself. Hence, this process is a cost effective and efficient method for producing neotame coated carrier compositions.

In the first step of the process of the present invention, a carrier is heated to a temperature above the melting point of N-[N-(3,3-dimethylbutyl)-L-α-aspartyl]-L-phenylalanine 1-methyl ester with or without agitation. For example, the melting points of neotame monohydrate and anhydrous neotame are about 82° C. and 92° C., respectively. Generally, however, a carrier is heated to a temperature from about 80° C. to about 150° C. and preferably from about 105° C. to about 120° C.

It may be possible to form neotame coated carrier compositions by heating a carrier to a temperature just below a melting point of neotame, for example, to a temperature from about 50° C. to about 80° C. Without being bound to theory, it is believed that it is possible to do this due to the unique annealing properties of neotame at such temperatures.

The process of the present invention can be conducted in any suitable reaction vessel, which can be heated to an elevated temperature. For example, a jacketed Groen kettle or a plowshare mixer such as a Processall (Processall, Inc., Cincinnati, Ohio) can be utilized.

Any carrier that can withstand the elevated temperatures of the present process is suitable for use. Such carriers include, but are not limited to, sucrose, citric acid, maltodextrin, dextrose, lactose, inulin, erythritol, sorbitol, maltitol, lactitol, isomalt, maltose, tagatose, fructose, polyols, polydextrose, cellulose and cellulose derivatives, aspartame, acesulfame salts, sucralose, cyclamate, saccharin, stevioside, alitame, malic acid and mixtures thereof. Further exemplary carriers include any of the taste-modifying additives disclosed in U.S. Provisional Patent Application Nos. 60/134,058 or 60/134,064, both filed May 13, 1999, the disclosure of both of which is incorporated by reference herein. It is also possible to use carriers that have been previously coated with another material. Preferably, the carrier is sucrose, citric acid, lactose or acesulfame-K.

In the second step of the present process, N-[N-(3,3-dimethylbutyl)-L-α-aspartyl]-L phenylalanine 1-methyl ester is combined with the heated carrier and mixed in uniformly. There is no need to heat the neotame prior to its combination with the heated carrier, though it is possible to do so. Preferably, neotame is added in an amount from about 0.01% to about 12%, preferably from about 0.1% to about 5%, and most preferably from about 1% to about 2.5% by weight of the carrier.

Generally, the neotame is added to the heated carrier at any point at which the temperature is sufficient to melt the neotame but at which the temperature is not high enough to degrade the neotame. One of ordinary skill in the art would readily appreciate the balance that must be attained with respect to these two competing considerations. One of ordinary skill in the art would also readily appreciate the mechanical limitations associated with the addition of neotame to the various apparatuses which may be employed in the present invention. For example, overly vigorous agitation of the sticky mixture tends to cause mechanical difficulty, as well as clumping and balling of the neotame/carrier mixture.

In certain embodiments of the present invention, the neotame is added after cooling of the carrier is begun and when the temperature of the carrier is from about 150° C. to about 75° C. and preferably from about 110° C. to about 90° C. By adding the neotame in this way, neotame's tendency to stick to the reaction vessel wall (i.e., the hottest surface) is reduced and its tendency to stick to the hot carrier is desirably increased. Cooling can be accomplished by any suitable means, including a cool water jacket or an air-controlled fluidized bed.

U.S. Pat. Nos. 5,480,668, 5,510,508 and 5,728,862 describe the preparation of N-[N-(3,3-dimethylbutyl)-L-α-aspartyl]-L-phenylalanine 1-methyl ester suitable for use in the present invention and are incorporated by reference herein; the monohydrate form of neotame is described therein. Further, other forms of neotame may be used in the compositions of this invention, including the various crystalline and amorphous forms of neotame, as disclosed in U.S. Provisional Patent Application No. 60/122,969, filed Mar. 3, 1999 and No. 60/109,391, filed Nov. 20, 1998, respectively. In addition, neotame produced by drying a given form of neotame is also suitable for use in the present invention.

In the third step of the process of the present invention, the mixture of the carrier and the neotame is allowed to cool with gentle agitation. Generally, once the mixture is cooled to a temperature from about 70° C. to about 50° C., neotame coated carrier compositions are obtained. Obviously, it is possible to further cool the neotame coated carrier compositions of this invention, and typically they are cooled to at least room temperature for ease of handling.

A separate drying step is not necessary in the method of the present invention, as this process is, in effect, a drying process.

A second embodiment of the present invention is directed to the N-[N-(3,3-dimethylbutyl)-L-α-aspartyl]-L-phenylalanine 1-methyl ester coated carrier compositions produced by the above-described process. These compositions comprise a carrier and neotame. Preferably neotame is present in an amount from about 0.01% to about 12%, preferably from about 0.1% to about 5%, and most preferably from about 1% to about 2.5% by weight of the carrier.

The particle morphology of the neotame coated carrier compositions of the present invention is similar to that of the carrier. The particle size distribution of the neotame coated carrier compositions of the present invention can be varied by manipulation of the carrier used. For example, fruit sugar, having a different granulation and particle size distribution from typical sucrose, can be coated with neotame.

The N-[N-(3,3-dimethylbutyl)-L-α-aspartyl]-L-phenylalanine 1-methyl ester coated carrier compositions of this invention can be used in combination with, known natural sweeteners as well as other high intensity sweeteners. Sweeteners that may be employed include, without limitation, aspartame, acesulfame salts (e.g., acesulfame-K), sucralose, saccharin, alitame, cyclamates, stevia derivatives, thaumatin, sucrose, fructose, glucose (dextrose), polyol sugar alcohols, invert sugar and mixtures thereof.

The N-[N-(3,3-dimethylbutyl)-L-α-aspartyl]-L-phenylalanine 1-methyl ester coated carrier compositions of this invention are suitable for use in any food to replace or supplement natural sweeteners, as well as other high intensity sweeteners, normally used as sweeteners. The term food as used herein includes, for example, beverages, fluid dairy products, condiments, baked goods, frostings, bakery fillings, cereals, nutraceuticals, gelatins, candy and chewing gum. In that regard, the disclosures of,copending U.S. patent application Ser. No. 09/213,263, now abandoned, Ser. No. 09/213,860, now abandoned, and Ser. No. 09/215,460, now abandoned, all filed Dec. 17, 1998, directed to the use of neotame in dairy products, baked goods and beverages, respectively, are incorporated by reference herein. Further, the disclosures of copending U.S. Provisional Patent Application No. 60/112,915, filed Dec. 18, 1998, No. 60/125,617, filed Mar. 22, 1999, No. 60/126,191, filed Mar. 25, 1999, and No. 60/126,654, filed Mar. 29, 1999, directed to the use of neotame in chewing gum, cereals, gelatins and nutraceuticals, respectively, are incorporated by reference herein.

This invention is also directed to a sweetened food composition, such as described above, containing an effective amount of the N-[N-(3,3-dimethylbutyl)-L-α-aspartyl]-L-phenylalanine 1-methyl ester coated carrier composition of this invention to sweeten the food composition. Determination of the amount of N-[N-(3,3-dimethylbutyl)-L-α-aspartyl]-L-phenylalanine 1-methyl ester coated carrier composition to be added to the food composition can be readily determined by one of ordinary skill in the art.

The neotame coated carrier compositions of the present invention can be used for this purpose alone or in combination with known bulking agents. Suitable bulking agents include, but are not limited to, dextrose, maltodextrin, lactose, inulin, polyols, polydextrose, cellulose and cellulose derivatives and organic acids including, but not limited to, citric acid and malic acid. Such a product may be suitable for use especially for table-top sweeteners and powdered soft drinks. In that regard, the disclosure of copending U.S. patent application Ser. No. 09/215,461, filed Dec. 17, 1998, now abandoned, directed to the use of neotame in table-top compositions is incorporated by reference herein. A table-top sweetener comprising the present neotame coated carrier compositions may also include any other ingredients commonly present in table-top sweeteners in order to tailor the taste of the product to a specific end use. A table-top sweetener comprising a neotame coated carrier composition of the present invention may take any known form. Suitable forms include, but are not limited to, sachets including the sweetener in powder or granular form, tablets, liquid sweeteners, and jar, pouches, pocket or other forms in which the sweetener may be measured in, for example, spoon for spoon form.

The Examples which follow are intended as an illustration of certain preferred embodiments of the invention, and no limitation of the invention is implied.

EXAMPLE 1

1% N-[N-(3,3-dimethylbutyl)-L-α-aspartyl]-L-phenylalanine 1-methyl ester Coated Sucrose Composition Three kilograms (3 kg) of sugar were added to a 5 gallon Groen tank and heated with steam to 200° F. (93° C.). Cooling water was turned on to jacket the tank, and 30 g neotame were added. The batch was mixed until cooled to 120° F. (49° C.).

EXAMPLE 2

2.5% N-[N-(3,3-dimethylbutyl)-L-α-aspartyl]-L-phenylalanine 1-methyl ester Coated Sucrose Composition Thirty-six kilograms (36 kg) of sugar were added to a 140 liter Processall with scraper plows (140 L MixMill, Processall, Inc., Cincinnati, Ohio). RPMs were set at 5. The sugar was heated to 212° F. (100° C.) and then cooling was begun. When the temperature of the sugar 25 dropped between 210° F. (99° C.) and 200° F. (93° C.), 900 g neotame were added and the RPMs were reduced to 3. The mixture was thick and pasty upon addition of the neotame, but began to break up as the temperature reached 163° F. (73° C.).

EXAMPLE 3

2.5% N-[N-(3,3-dimethylbutyl)-L-α-aspartyl]-L-phenylalanine 1-methyl ester Coated Fruit Sugar Composition Three kilograms (3 kg) of fruit sugar were heated with steam to 230° F. (110° C.). Cooling water was turned on briefly to jacket the tank, and 30 g neotame were added when the temperature reached 220° F. (105° C.). The batch was cooled to 130° F. (54° C.).

EXAMPLE 4

N-[N-(3,3-dimethylbutyl)-L-α-aspartyl]-L-phenylalanine 1-methyl ester Coated Citric Acid Composition Anhydrous citric acid (6.125 g) was heated to 230° F. (110° C.). A cool water jacket was started. Neotame (125 g) was added at 220° F. (104° C.). The mixture was cooled to about 120° F. (49° C.).

Other variations and modifications of this invention will be obvious to those skilled in this art. This invention is not to be limited except as set forth in the following claims.

What is claimed is:

1. A method of coating N-[N-(3,3-dimethylbutyl)-L-α-aspartyl]-L-phenylalanine 1-methyl ester onto a carrier comprising the steps of:

(a) heating the carrier to a temperature above the melting point of the N-[N-(3,3-dimethylbutyl)-L-α-aspartyl]-L-phenylalanine 1-methyl ester;

(b) combining the N-[N-(3,3-dimethylbutyl)-L-α-aspartyl]-L-phenylalanine 1-methyl ester with the heated carrier to form a mixture; and (c) cooling the mixture of carrier and N-[N-(3,3-dimethylbutyl)-L-α-aspartyl]-L-phenylalanine 1-methyl ester to form a N-[N-(3,3-dimethylbutyl)-L-α-aspartyl]-L-phenylalanine 1-methyl ester coated carrier composition.

2. The method according to claim 1, wherein the carrier is selected from the group consisting of sucrose, citric acid, maltodextrin, dextrose, lactose, inulin, erythritol, sorbitol, maltitol, lactitol, isomalt, maltose, tagatose, fructose, polyols, polydextrose, cellulose and cellulose derivatives, aspartame, acesulfame salts, sucralose, cyclamate, saccharin, stevioside, alitame, malic acid and mixtures thereof.

3. The method according to claim 2, wherein the carrier is selected from the group consisting of sucrose, citric acid, lactose, acesulfame-K and mixtures thereof.

4. The method according to claim 1, wherein the carrier is heated to a temperature from about 80° C. to about 150° C.

5. The method according to claim 4, wherein the carrier is heated to a temperature from about 105° C. to about 120° C.

6. The method according to claim 1, wherein the N-[N-(3,3-dimethylbutyl)-L-α-aspartyl]-L-phenylalanine 1-methyl ester is combined with the carrier in an amount from about 0.01% to about 12% by weight of the carrier.

7. The method according to claim 6, wherein the N-[N-(3,3-dimethylbutyl)-L-α-aspartyl]-L-phenylalanine 1-methyl ester is combined with the carrier in an amount from about 0.1% to about 5% by weight of the carrier.

8. The method according to claim 7, wherein the N-[N-(3,3-dimethylbutyl)-L-α-aspartyl]-L-phenylalanine 1-methyl ester is combined with the carrier in an amount from about 1% to about 2.5% by weight of the carrier.

* * * * *